United States Patent
Beckert et al.

(10) Patent No.: US 9,233,430 B2
(45) Date of Patent: Jan. 12, 2016

(54) MOUNTED OPTICAL COMPONENT, METHOD FOR THE PRODUCTION THEREOF AND USE OF SAME

(75) Inventors: Erik Beckert, Arnstadt (DE); Christoph Damm, Jena (DE); Thomas Burkhardt, Jena (DE); Marcel Hornaff, Weimar (DE)

(73) Assignees: FRAUHNHOFER-GESELLSCHAFT ZUR FOERDERUNG DER ANGEWANDTEN FORSCHUNG E.V., Munich (DE); FRIEDRICH-SCHILLER-UNIVERSITAET JENA, Jena (DE)

( * ) Notice: Subject to any disclaimer, the term of this patent is extended or adjusted under 35 U.S.C. 154(b) by 36 days.

(21) Appl. No.: 13/261,022

(22) PCT Filed: May 20, 2010

(86) PCT No.: PCT/EP2010/003101
§ 371 (c)(1),
(2), (4) Date: Jan. 26, 2012

(87) PCT Pub. No.: WO2010/133368
PCT Pub. Date: Nov. 25, 2010

(65) Prior Publication Data
US 2012/0118499 A1 May 17, 2012

(30) Foreign Application Priority Data
May 20, 2009 (DE) .......................... 10 2009 022 079

(51) Int. Cl.
*C09J 5/00* (2006.01)
*B23K 1/00* (2006.01)
*B23K 1/005* (2006.01)
*G02B 7/00* (2006.01)
(Continued)

(52) U.S. Cl.
CPC ............. *B23K 1/0008* (2013.01); *B23K 1/0056* (2013.01); *G02B 7/00* (2013.01); *G02B 7/02* (2013.01); *G02B 7/18* (2013.01); *Y10T 156/10* (2015.01); *Y10T 403/47* (2015.01)

(58) Field of Classification Search
CPC ...... B23K 1/0008; B23K 1/0056; G02B 7/18; G02B 7/02; G02B 7/00
USPC .............................................. 403/265; 355/67
See application file for complete search history.

(56) References Cited

U.S. PATENT DOCUMENTS

| 6,103,401 A | * | 8/2000 | Okada et al. | ................... 428/634 |
| 6,151,439 A | * | 11/2000 | Wainwright | ........... D05C 15/00 156/379.8 |
| 6,974,719 B2 | | 12/2005 | Kabs et al. | |

(Continued)

FOREIGN PATENT DOCUMENTS

| DE | 37 19 382 A1 | 12/1988 |
| DE | 69 627 638 T2 | 12/2003 |

(Continued)

OTHER PUBLICATIONS

Machine Translation of DE102006050653A1, May 1, 2014.*

*Primary Examiner* — Daniel McNally
(74) *Attorney, Agent, or Firm* — Marshall & Melhorn, LLC

(57) ABSTRACT

The invention relates to a mounted optical component and also a method for the production of mounted optical components. Furthermore, the invention relates to the use of mounted optical components.

14 Claims, 2 Drawing Sheets

(51) Int. Cl.
    *G02B 7/02*    (2006.01)
    *G02B 7/18*    (2006.01)

(56) References Cited

U.S. PATENT DOCUMENTS

2008/0204689 A1    8/2008    Heintel et al.
2009/0244508 A1*  10/2009    Schoeppach et al. .......... 355/67
2010/0038348 A1    2/2010    Beckert et al.

FOREIGN PATENT DOCUMENTS

| DE | 10 240 355 A1 | 3/2004 |
| DE | 10 2006 050 653 A1 | 4/2008 |
| DE | 10 2007 044 054 A1 | 4/2008 |
| DE | 102006050653 A1 * | 4/2008 |
| DE | 10 2008 040 287 A1 | 3/2009 |
| WO | WO 8809948 A * | 12/1988 |
| WO | WO 2008/083676 A1 | 7/2008 |

* cited by examiner

MOUNTED OPTICAL COMPONENT, METHOD FOR THE PRODUCTION THEREOF AND USE OF SAME

BACKGROUND OF THE INVENTION

The invention relates to a mounted optical component and also a method for the production of mounted optical components. Furthermore, the invention relates to the use of mounted optical components.

In a standard manner, optical components are mounted or clamped by means of a form-fit and frictional fit. Alternatively and of particular interest for small or very sensitive components, integral methods, predominantly glueing, can be used. If polymer-based adhesives require to be replaced by inorganic joining media because of particular conditions of use, soft solder alloys are possible.

In order that soft solder alloys can be applied as joining medium, it is necessary to produce wettable metallisations, e.g. by vacuum coating or sputtering on the joining geometries of the components and the mounting. The wettable layer can be provided at the same time with the solder material as thin-film system, alternatively solder is applied as a discrete volume. The melting is effected by means of laser since the energy input must be effected locally and temporally discretely in order not to destroy sensitive optical components. Melting of the solder by standard reflow processes is ruled out because of the cleanliness requirements of the lens system and also because of the generally greatly differing thermal coefficients of expansion of component and mounting, which would lead to impermissible thermomechanical stresses during global heating of the assembly to be joined.

In the past, the greatly differing heat conductivity of the two partners to be joined, optical component and mounting, has proved to be critical for the laser soldering process. Because of the high temperature gradient in the mounting material which generally has a high to very high thermal conductivity, the process must take place in general with high laser powers in order to enable local heating and hence wetting. This is at variance with the requirement to keep the laser power as low as possible in order not to damage the poorly heat-conducting, optical component. Correspondingly, joining places of lens systems to mountings made of metal or ceramic have to date been very difficult to control when using solder as joining medium and the laser as energy source for the melting.

The underlying object is the joining of optical components, i.e. lenses, mirrors, prisms etc., made of a generally glasslike, poorly heat-conducting material, in a mounting (optomechanical component, generally made of readily heat-conducting material, such as metal or ceramic, for incorporation of the optical component in the overall system) by means of the integral joining method, "soldering".

This object is achieved by the mounted optical component having the features of claim 1. Claim 11 relates to a method for the production of a mounted optical component and claim 14 to the use of mounted optical components. The further dependent claims reveal advantageous developments.

BRIEF SUMMARY OF THE INVENTION

According to the invention, the mounted optical component has at least one optical component and a mounting joined integrally herewith, the at least one optical component and/or the mounting having a wettable layer at least in the joining region, the mounting tapering in the direction of the joining region and the joining medium overlapping the tapering part of the mounting at least in regions, the mounting having one side, which is orientated towards the optical component, as front side and one side, which is orientated away from the optical component, as rear-side and the optical component being in contact with the front-side of the mounting at least in regions.

The object underlying the invention is to reduce the thermal conductivity of the mounting component at the joining place or in the joining region locally and, at the same time, to enable precise application of the solder and hence the joining medium, which leads to an integral and form-fit connection. By means of the locally reduced thermal conductivity, an energy input which is substantially smaller and hence better adapted to the optical component is required to ensure wetting of the solder.

Preferably, the mounting tapers linearly, constantly or in steps. The joining surface which is situated on the optical component, situated opposite and provided with a wettable metallisation can have any shapes, such e.g. planar, cylindrical or a free form.

The angle between the normal of the joining surface and a straight line applied at the tapering region of the mounting can be between ≥0° and ≤90°. Cone geometries which have this angle region thereby permit mechanically stable mounting structures.

Preferably, the mounting of the mounted optical component has, on the side orientated towards the wettable layer, a pocket into which the joining medium can penetrate at least partially. It is advantageous in this variant that the solder volume situated in the pocket after melting contracts substantially more greatly than the surrounding material because of the thermal expansion and hence produces a force on the component along the conical axis and in the direction of the mounting. The optical component is hence prestressed, the layer thereof remains, at the same time, extensively unchanged laterally relative to the conical axis, which can be important for precision assembly.

In a further embodiment, the joining region of the mounted optical component has a diameter of 70 μm to 700 μm. These diameters apply for circular bases. In this variant, the underside of the cone terminates with an opening or joining surface which is dimensioned such that a sufficient proportion of the solder volume is still situated in the region of the cone and hence forms the form-fit. At the same time, the "annular cutting edge" on the base of the cone represents the structure with the local low thermal conductivity and the optimised wetting behaviour since little material volume is available here for heat conduction.

In one embodiment of the mounted optical component, a stepped tapered mounting acts as membrane spring for compensation of different heat expansions of the mounting and the optical component which possibly has a curved surface. A conical angle of 90° which leads to a blind boring with a flat base has flexibility in the sense of a membrane spring to a specific degree, which can prove to be advantageous if two components with greatly differing thermal expansion are intended to be joined together. The resilient effect then leads to compensation of expansion differences, which can occur for example during operation and storage.

The mounting of the mounted optical component can consist of metal, ceramic or polymer or comprise this. Hence, as a function of the sphere of use, the size and also the surrounding conditions, stable mountings are made possible.

The optical component can be a lens, a prism, a mirror, a grating or an end cap. Also the use of all conceivable optical components is possible here.

Preferably, the wettable layer consists of at least one metal or one metal alloy or comprises this. The joining medium can consist of metallic solder or soft solder or comprise this.

This leads to improved wetting of metallic mounting geometries in the joining method, soldering, with simultaneously minimised energy input for melting the solder. Minimised thermomechanical stresses of sensitive optical components, higher strength of the connection because of better wetting of the solder and high accuracies because of joining forces acting merely in the conical axis result herefrom.

There is understood by solder according to the invention, a metal alloy which consists of a specific quantity ratio of metals, according to the individual case. Tin, silver, copper and, only exceptionally, lead are used mainly here. Normally, the melting temperature of the solder is lower than that of the individual metals or that of the workpiece.

Solders are termed hard solders or soft solders, according to definition, on the basis of their liquid temperature, soft solders having softening temperatures below 450° C. The softening temperature for hard solders is above 450° C.

Eutectic alloys, generally based on silver or brass, are termed hard solders. A further class of hard solders are phosphorus solders.

Tin solders belong in the class of soft solders. Further components of soft solders are e.g. antimony, cadmium, aluminium, phosphorus, silver bismuth, copper, nickel, tin and, only exceptionally, lead.

In general, all soft solder alloys can be used according to the invention.

Furthermore, the invention relates to a method for the production of a mounted optical component, as described above, a wettable layer being applied in a first step on the at least one optical component which is connected in a second step to the at least one mounting by means of a joining medium.

In this method, the joining medium can be melted, wetted and cooled by means of laser radiation. Further possibilities in this respect are for example inductive methods or those with infrared radiation. As a function of the lens system and the materials which are used, the best suited melting method can hence be chosen. A treatment with radiation can hereby be effected at a precise point, as a result of which very high precision can be achieved.

In a preferred variant of the method, the wettable layer is produced by means of chemical vapour deposition (CVD), physical vapour deposition (PVD), by vacuum coating and/or sputtering or by means of galvanising. Wettable layer systems ending with gold are advantageous for the flux-free processing during soldering.

Furthermore, the invention comprises the use for application of mounted optical components in high-power laser optics, in optics for short wavelengths, in particular in the ultraviolet, EUV or X-ray range, in space optics, in optoelectronic constructions, in laser systems, in spectroscopes, in optics for medical technology which possibly can be autoclaved.

Hence, a field of use and assembly of macroscopic and also miniaturised optical components in (predominantly metallic, but also ceramic) mountings is possible, in particular when metallic solders, as integral joining medium, have advantages in application with respect to temperature and radiation stability, low gassing-out in a vacuum, suitability for low temperature and also electrical and thermal conductivity.

The subject according to the application is intended to be explained in more detail with reference to the subsequent FIGS. 1 to 4, without wishing to restrict said subject to the special embodiments shown here.

DETAILED DESCRIPTION OF THE INVENTION

Figure 1:
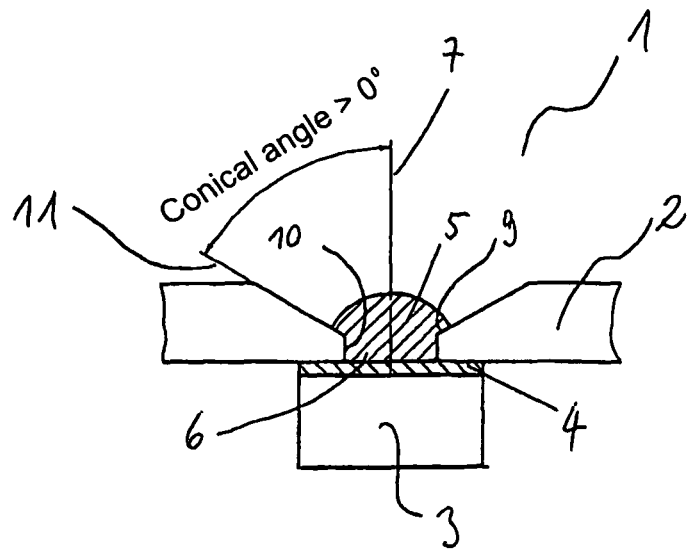
FIG. 1 shows a mounted optical component with a wide joining region.

In FIG. 1, a mounted optical component 1 is represented. The mounting 2 hereby abuts directly against the metallised layer 4 of the optical component 3. In this Figure, the joining region 6 is circular. The solder 5 wets both the joining region 6 and the joining surface 9 and also the cylindrical inside 10 of the mounting 2. The conical angle which is produced between the conical axis 7 and a straight line 11 which is applied to the mounting 2 is in the range of >0°.

Figure 2:
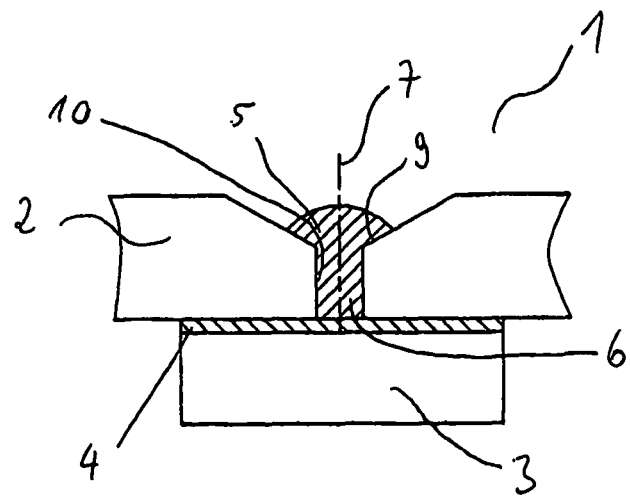
FIG. 2 shows a mounted optical component with a narrow joining region.

FIG. 2 shows a further embodiment of the mounted optical component 1. The radius of the joining region 6, relative to the cylindrical inside 10 which is wetted with solder 5, is significantly smaller than the variant represented in FIG. 1. The optical component 3 which is present in cuboid form is provided with a wettable layer 4 on the side thereof pointing towards the mounting 2. The solder or joining medium 5 has a rivet-like shape, wetting the mounting 2 in the region of the joining surface 9, the cylindrical inside 10 and also the joining region 6.

Figure 3:
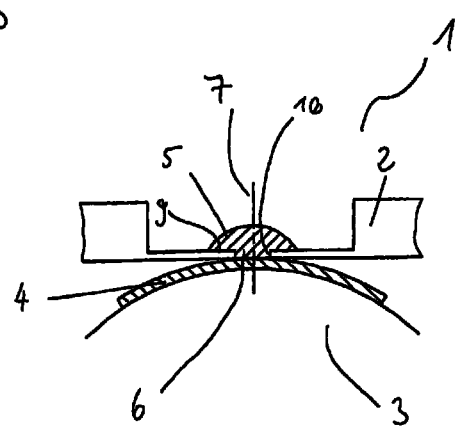
FIG. 3 shows a mounted optical component with a blind boring.

In FIG. 3, a mounted optical component 1 is illustrated, the mounting 2 here having a blind boring. The optical component 3 has a curved surface which is provided with a wettable layer 4 which covers the surface of the optical component 3 in portions. The solder 5 wets both the wettable layer 4 in the joining region 6 and the cylindrical inside 10 of the mounting 2 and the joining surface 9 of the mounting 2.

Figure 4:
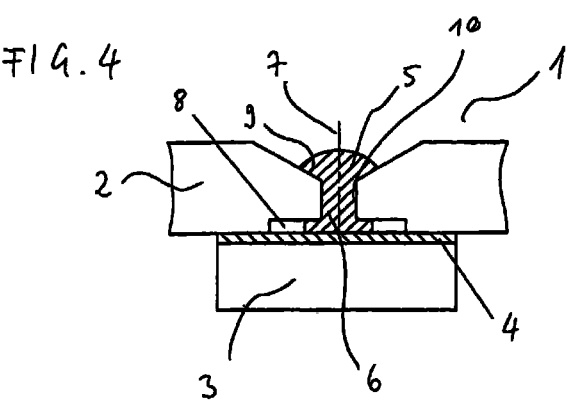
FIG. 4 shows a mounted optical component with a pocket.

FIG. 4 shows an embodiment of the mounted optical component 1, the mounting 2 having a pocket 8 in addition. The optical component 3 is coated completely and uniformly with a wettable layer 4 on the side orientated towards the mounting 2. The solder 5 wets both the joining region 6 and the cylindrical inside 10 of the mounting 2 and the joining surface 9.

The invention claimed is:

1. A mounted optical component having at least one optical component and a mounting which is joined integrally herewith, the mounting having a cylindrical inside and the at least one optical component and/or the mounting having a wettable layer at least in a joining region, wherein the mounting tapers in the direction of the joining region and a joining medium overlaps the tapering part of the mounting at least in regions and the joining medium wets the cylindrical inside, wherein the joining medium has a rivet-like shape, and the mounting also having one side, which is orientated towards the optical component, as front-side and one side, which is orientated away from the optical component, as rear-side, wherein the front side is not an inside of the mounting, and the optical component being in contact with the front-side of the mounting at least in regions.

2. The mounted optical component according to claim 1, wherein the mounting tapers linearly, constantly or in steps.

3. The mounted optical component according to claim 2, wherein an angle between the normal of a joining surface and a straight line applied at the tapering region of the mounting is ≥0° and ≤90°.

4. The mounted optical component according to claim 2, wherein a stepped tapering mounting acts as membrane spring for compensation of different heat expansions of the mounting and the optical component which possibly has a curved surface.

5. The mounted optical component according to claim 1, wherein the mounting has, on the side orientated towards the wettable layer, a pocket into which the joining medium can penetrate at least partially.

6. The mounted optical component according to claim 1, wherein the joining region has a diameter of 70 µm to 700 µm.

7. The mounted optical component according to claim 1, wherein the mounting either consists of or comprises metal, ceramic or polymer.

8. The mounted optical component according to claim 1, wherein the optical component is a lens, mirror, prism, grating or end cap.

9. The mounted optical component according to claim 1, wherein the wettable layer either consists of or comprises at least one metal or one metal alloy.

10. The mounted optical component according to claim 1, wherein the joining medium either consists of or comprises metallic solder or soft solder.

11. A method for the production of a mounted optical component according to claim 1, a wettable layer being applied in a first step on the at least one optical component which is connected in a second step to the at least one mounting by means of a joining medium.

12. The method according to claim 11, wherein the joining medium is melted, wetted and cooled by means of laser radiation.

13. The method according to claim 11, wherein the wettable layer is produced by means of chemical vapour deposition (CVD), physical vapour deposition (PVD), by vacuum coating and/or sputtering or by means of galvanising.

14. A mounted optical component having at least one optical component and a mounting which is joined integrally herewith, the mounting having a cylindrical inside and the at least one optical component and/or the mounting having a wettable layer at least in a joining region, wherein the mounting tapers in the direction of the joining region and a joining medium overlaps the tapering part of the mounting at least in regions and the joining medium wets the cylindrical inside, wherein the joining medium has a rivet-like shape, and the mounting also having one side, which is orientated towards the optical component, as front-side and one side, which is orientated away from the optical component, as rear-side, wherein the front side is not an inside of the mounting, and the at least one optical component being in contact with the front-side of the mounting at least in regions, and the at least one optical component is not in contact with a cylindrical inside or a conical inside of the mounting.

\* \* \* \* \*